US011402490B2

(12) United States Patent
Lindstrom

(10) Patent No.: US 11,402,490 B2
(45) Date of Patent: Aug. 2, 2022

(54) AUTOMATIC SETTING-UP OF HYGIENE EQUIPMENT

(71) Applicant: Essity Hygiene and Health Aktiebolag, Gothenburg (SE)

(72) Inventor: Hakan Lindstrom, Gothenburg (SE)

(73) Assignee: ESSITY HYGIENE AND HEALTH AKTIEBOLAG, Gothenburg (SE)

( * ) Notice: Subject to any disclaimer, the term of this patent is extended or adjusted under 35 U.S.C. 154(b) by 229 days.

(21) Appl. No.: 16/467,521

(22) PCT Filed: Dec. 7, 2016

(86) PCT No.: PCT/EP2016/080144
§ 371 (c)(1),
(2) Date: Jun. 7, 2019

(87) PCT Pub. No.: WO2018/103847
PCT Pub. Date: Jun. 14, 2018

(65) Prior Publication Data
US 2019/0331786 A1 Oct. 31, 2019

(51) Int. Cl.
*G01S 13/76* (2006.01)
*G01S 13/87* (2006.01)
(Continued)

(52) U.S. Cl.
CPC .......... *G01S 13/76* (2013.01); *G01S 13/878* (2013.01); *A47K 5/00* (2013.01); *A47K 10/24* (2013.01)

(58) Field of Classification Search
CPC .......... G01S 13/76; G01S 13/878; G01S 5/10; G01S 5/02; A47K 5/00; A47K 10/24;
(Continued)

(56) References Cited

U.S. PATENT DOCUMENTS 4,412,292 A * 10/1983 Sedam .................... G07F 9/002
700/241
6,727,818 B1 4/2004 Wildman et al.
(Continued)

FOREIGN PATENT DOCUMENTS

AU 2014227493 A1 4/2015
EP 0919442 A2 * 6/1999 ........... B60R 25/102

OTHER PUBLICATIONS

European Patent Office, Communication Pursuant to Article 94(3) EPC, International Application No. 16809361.5, dated Sep. 30, 2020 (6 pages).
(Continued)

*Primary Examiner* — Bernarr E Gregory
(74) *Attorney, Agent, or Firm* — Cantor Colburn LLP

(57) ABSTRACT

A piece of hygiene equipment configured to dispense a consumable to a user includes a processing circuit and a radio circuit. The radio circuit is configured to receive and transmit a radio signal carrying payload data, and the processing circuit is configured to obtain information on a positional relationship to another device by instructing the radio circuit to receive and/or transmit a radio signal carrying first payload data. The processing circuit is configured to generate second payload data on the basis of the obtained information on the obtained positional relationship, and to instruct the radio circuit to transmit a radio signal carrying said second payload data.

24 Claims, 4 Drawing Sheets

(51) Int. Cl.
*A47K 5/00* (2006.01)
*A47K 10/24* (2006.01)

(58) Field of Classification Search
CPC ....... A61B 90/00; B60R 25/102; G07F 21/88; G07F 9/002; G06Q 20/16; G06Q 20/18
See application file for complete search history.

(56) References Cited

U.S. PATENT DOCUMENTS

| | | | |
|---|---|---|---|
| 7,084,737 B1 * | 8/2006 | Moore | G07F 9/002 340/5.91 |
| 7,432,807 B2 * | 10/2008 | Schmitt | A61B 90/00 340/539.13 |
| 7,783,380 B2 | 8/2010 | York et al. | |
| 7,899,396 B2 | 3/2011 | Meylan et al. | |
| 8,131,231 B2 | 3/2012 | Yu et al. | |
| 8,135,344 B2 | 3/2012 | Krueger et al. | |
| 8,565,112 B2 | 10/2013 | Peiris et al. | |
| 8,684,236 B2 | 4/2014 | Ophardt | |
| 8,687,732 B2 | 4/2014 | Guo et al. | |
| 8,725,080 B2 | 5/2014 | Stankovska et al. | |
| 8,750,796 B2 | 6/2014 | Claus et al. | |
| 8,761,124 B2 | 6/2014 | Iacono et al. | |
| 8,823,494 B1 | 9/2014 | Kovitz et al. | |
| 9,265,383 B2 | 2/2016 | Yang et al. | |
| 9,445,222 B2 | 9/2016 | Salokannel et al. | |
| 9,686,049 B2 | 6/2017 | Fischer | |
| 9,886,810 B1 | 2/2018 | Murphy | |
| 9,892,372 B2 | 2/2018 | Himmelmann et al. | |
| 9,913,562 B2 | 3/2018 | Wegelin et al. | |
| 10,238,242 B2 | 3/2019 | Macleod et al. | |
| 10,410,507 B2 | 9/2019 | Pi | |
| 10,464,091 B2 | 11/2019 | Ophardt et al. | |
| 10,524,621 B2 | 1/2020 | Ophardt | |
| 10,685,528 B2 | 6/2020 | Murphy | |
| 2003/0033054 A1 * | 2/2003 | Yamazaki | G07F 9/002 700/236 |
| 2004/0162106 A1 | 8/2004 | Monroe et al. | |
| 2005/0035862 A1 | 2/2005 | Wildman et al. | |
| 2006/0096997 A1 * | 5/2006 | Yeo | G06Q 20/18 221/9 |
| 2007/0095901 A1 * | 5/2007 | Illingworth | G06Q 20/16 235/381 |
| 2008/0256648 A1 * | 10/2008 | Piccionelli | G06F 21/88 726/35 |
| 2010/0051637 A1 | 3/2010 | Shu | |
| 2010/0117823 A1 | 5/2010 | Wholtjen | |
| 2012/0245729 A1 | 9/2012 | Wegelin et al. | |
| 2012/0275319 A1 | 11/2012 | Peiris et al. | |
| 2014/0022941 A1 | 1/2014 | Apte et al. | |
| 2014/0179231 A1 * | 6/2014 | Charania | G07F 9/001 455/41.2 |
| 2015/0199883 A1 | 7/2015 | Hartley et al. | |
| 2016/0214817 A1 | 7/2016 | Borke et al. | |

OTHER PUBLICATIONS

Yasir Fayyaz et al: "Maximal Weight, Topology Discovery in Ad hoc Wireless Sensor Networks", 2010 10th IEEE International Conference on Computer and Information Technology (CIT), Piscataway, NJ, USA, Jun. 29, 2010, pp. 715-722, XP031757693, ISBN: 978-1-4244-7547-6, Paragraphs [OOVI]-[VI.V].

Clausen Lix T et al: "Mobile Ad Hoc Network (MANET) Neighborhood Discovery, Protocol (NHDP); rfc6130.txt", Mobile Ad Hoc Network (MANET) Neighborhood Discovery Protocol (NHDP); RFC6130.TXT, Internet Engineering Task Force, IETF; Standard, Internet Society (ISOC) 4, Rue Des Falaises CH- 1205 Geneva, Switzerland, Apr. 6, 2011 (Apr. 6, 2011), pp. 1-88, XP015075953, [retrieved on Apr. 6, 2011], Paragraph [0001], Paragraphs [0004] - [4.3.3].

Oliver Staerz: "Smart Building and Cities", Apr. 1, 2016, pp. 1-20, XP055394117, Retrieved from the Internet: URL:http://www.fh-salzburg.ac.at/fileadmin /fh/studiengaenge/smb/talks/smb_Talk-for-E xperts_2016_5senseManagement_Hagleitner_O liverStaerz.pUf, [retrieved on Jul. 26, 2017], pp. 9-13.

European Patent Office, International Search Report and Written Opinion of the International Searching Authority, International Application No. PCT/EP2016/080143, dated Aug. 7, 2017 (14 pages).

U.S. Patent and Trademark Office, Office Action, U.S. Appl. No. 16/467,514, dated Jun. 25, 2020 (14 pages).

European Patent Office, International Search Report and Written Opinion of the International Searching Authority, International Application No. PCT/EP2016/080144, dated Mar. 9, 2017 (10 pages).

European Patent Office, Communication Pursuant to Article 94(3) EPC, International Application No. 16810308.3, dated Oct. 9, 2020 (5 pages).

European Search Report issued for European Application No. 22152914.2; dated Apr. 29, 2022 (8 pages).

* cited by examiner

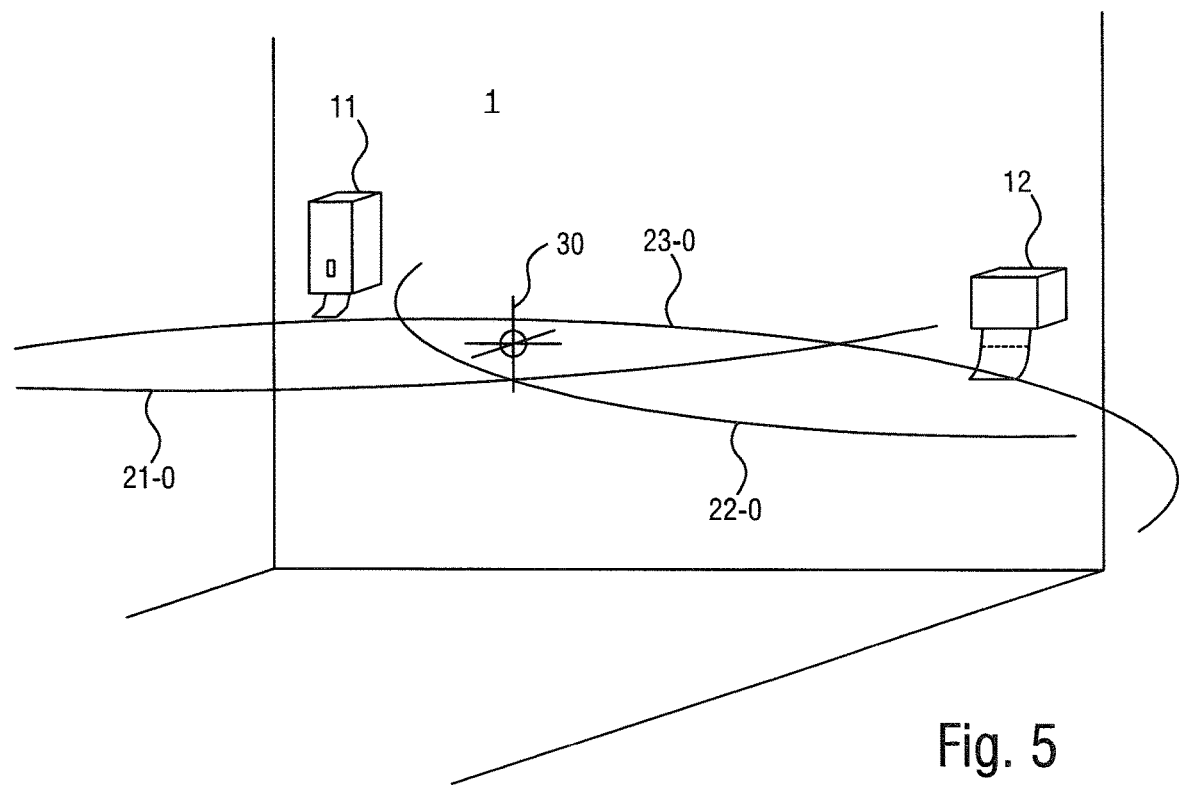
Fig. 5
Fig. 6A
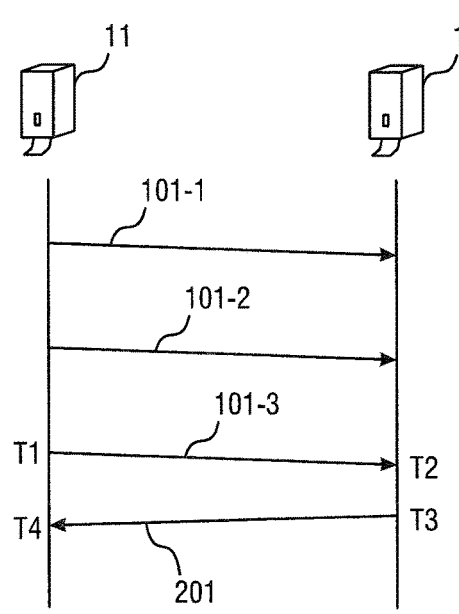
Fig. 6B
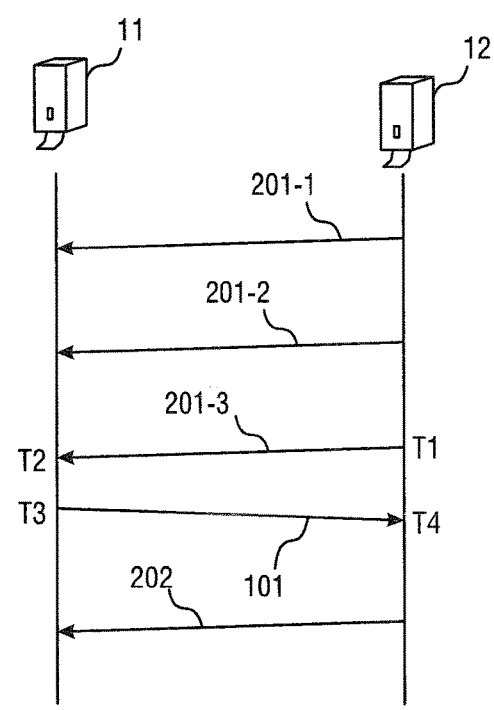

AUTOMATIC SETTING-UP OF HYGIENE EQUIPMENT

CROSS-REFERENCE TO RELATED APPLICATION

The present application is a national stage entry under 35 U.S.C. § 371 of, and claims priority to, International Application No. PCT/EP2016/080144, filed Dec. 7, 2016, the disclosure of which is hereby incorporated herein by reference in its entirety.

FIELD OF THE INVENTION

The present invention relates to hygiene equipment and to setting up and configuring individual pieces of hygiene equipment. More specifically, the present invention relates to a piece of hygiene equipment that can be arranged to dispense a consumable to a user, and/or to dispose a consumable from a user, and has capabilities to receive and/or transmit radio signals. The present invention also relates to a system formed by two or more corresponding pieces of hygiene equipment.

BACKGROUND OF THE INVENTION

Hygiene equipment in the form of, for example, dispensers for various liquids and/or tissues, is generally common today in premises that are frequented by many people. Specifically, such premises can be office buildings, manufacturing sites, hospitals, airports, train stations, bus terminals, shopping malls, hotels, restaurants, schools, kindergartens, and the like, which all have in common that they are places being visited by a considerable number of people and that hand or body hygiene or cleaning in general is desired at least to some degree. As a consequence, these premises will provide restroom or related facilities for the people working or staying in these premises.

In such facilities the mentioned hygiene equipment may be installed in form of soap, foam or towel dispensers, disinfectant (e.g., alcogel, etc.) dispensers, toilet paper dispensers, hygiene bag dispensers, dispensers for hygiene products, such as absorbent articles, diapers, incontinence products, and other related devices. Usually, such hygiene equipment is predominantly present in restroom or toilet facilities. Likewise, such equipment may be found in entrance halls, kitchens, kitchenettes, offices, restaurants, canteens, conference/meeting rooms, receptions, reception areas, elevator, waiting areas, printer rooms and docucenters, gyms, or disposal areas. In the case of a hospital, for example, hygiene equipment will be present virtually everywhere, since doctors and caring personnel will need access to such facilities also when not using a restroom or toilet facility. Specifically, there may be rules and schemes that prescribe the use of hygiene equipment whenever entering some dedicated area, when approaching a patient, or, generally, before carrying out any tasks that require respective hygiene.

It is known in the arts to provide hygiene equipment in the form of dispensers having sensors which can detect that a given supply is about to run out or has run empty. The result of this detection can be made visible on the dispenser so that service personnel can take notice of a necessity to refill the dispenser. Likewise, it is known to provide such hygiene equipment with electronic capabilities for not only detecting the necessity of a refill, but also for conveying information on such a necessity for a refill to a somewhat central location.

For example, a server of, or, connected to a data network (e.g., Internet) can receive and store such notifications in order for allowing service personnel to receive or obtain corresponding indications that a refill needs to be carried out. In this case the hygiene equipment may have capabilities to convey signals related to said notification via a wireless radio signal to a recipient station placed sufficiently near to the hygiene equipment.

It is furthermore common that in the above mentioned use cases of hospitals and the like there will be oftentimes a considerable number of individual pieces of hygiene equipment. Specifically, a hospital, airport, or a hotel will have a considerable number of rooms and associated restrooms, and, consequently, the number of individual pieces of hygiene equipment will oftentimes reach tenths, hundreds, or even thousands. At the same time, however, the hygiene equipment should employ its sensing and communication capabilities in a sensible manner so that—amongst others—each individual piece of hygiene equipment can detect that its supply of consumable runs empty and can report the corresponding need for a refill to some kind of central entity, which, in turn, can schedule a refill by sending personnel to the desired location. In other words, the personnel will need to know what to bring where in order to fulfil the refill request.

At this time, it becomes clear that there should be some knowledge on where a piece of hygiene equipment is installed and what identification it has or of what type it is, so that the mentioned suitable refill can be sent to the correct location. Although the prior arts provide for hygiene equipment that is able to (wirelessly) report the need of a refill and its respective identification information, the information on configuring the installation, including but not limited to naming each dispenser, define, describe and assign a location to each dispenser and setting up manageable and logical structures within software, still needs to be obtained by tedious manual configuration with so far only limited support from automated systems. These deficits in the prior arts become perhaps most imminent when the number of individual pieces of hygiene equipment becomes large, e.g., reaches or is above one hundred.

It is therefore an object of the present invention to provide a solution that can substantially facilitate the setting up and installation of hygiene equipment, even when the number of individual pieces to be installed becomes large. In some sense, it is a further object of the present invention to provide a piece of hygiene equipment that is capable to locate itself within a group of neighboring pieces of hygiene equipment and to convey related information to the desired entity, e.g., a central server.

SUMMARY OF THE INVENTION

According to one embodiment of the present invention, there is therefore provided a piece of hygiene equipment comprising a processing circuit and a radio circuit, wherein the radio circuit is configured to receive and transmit a radio signal carrying payload data, wherein the processing circuit is configured to obtain information on a positional relationship to another device by instructing the radio circuit to receive and/or transmit a radio signal carrying first payload data, and wherein the processing circuit is configured to generate second payload data on the basis of the obtained information on the obtained positional relationship, and to instruct the radio circuit to transmit a radio signal carrying said second payload data.

According to one embodiment of the present invention, there is therefore provided a method of operating a piece of hygiene equipment comprising a processing circuit and a radio circuit, the method comprising the steps of receiving and transmitting with the radio circuit a radio signal carrying payload data, obtaining information on a positional relationship to another device by instructing the radio circuit to receive and/or transmit a radio signal carrying first payload data, and generating second payload data on the basis of the obtained information on the obtained positional relationship, and to instruct the radio circuit to transmit a radio signal carrying said second payload data.

According to a further embodiment of the present invention, there is provided a system of a plurality of pieces of hygiene equipment in which at least a part of the pieces of hygiene equipment satisfy the requirement as set out in the corresponding embodiments of the present disclosure.

BRIEF DESCRIPTION OF THE DRAWINGS

Embodiments of the present invention, which are presented for better understanding the inventive concepts and which are not to be seen as limiting the invention, will now be described with reference to the figures in which:

FIG. 5 shows a schematic view of positioning with hygiene equipment according to an embodiment of the present invention;

FIGS. 6A to 6D show schematic views of mechanisms for ranging by employing a time-of-flight determination of radio signals according to embodiments of the present invention;

DETAILED DESCRIPTION OF THE INVENTION

Figure 1:
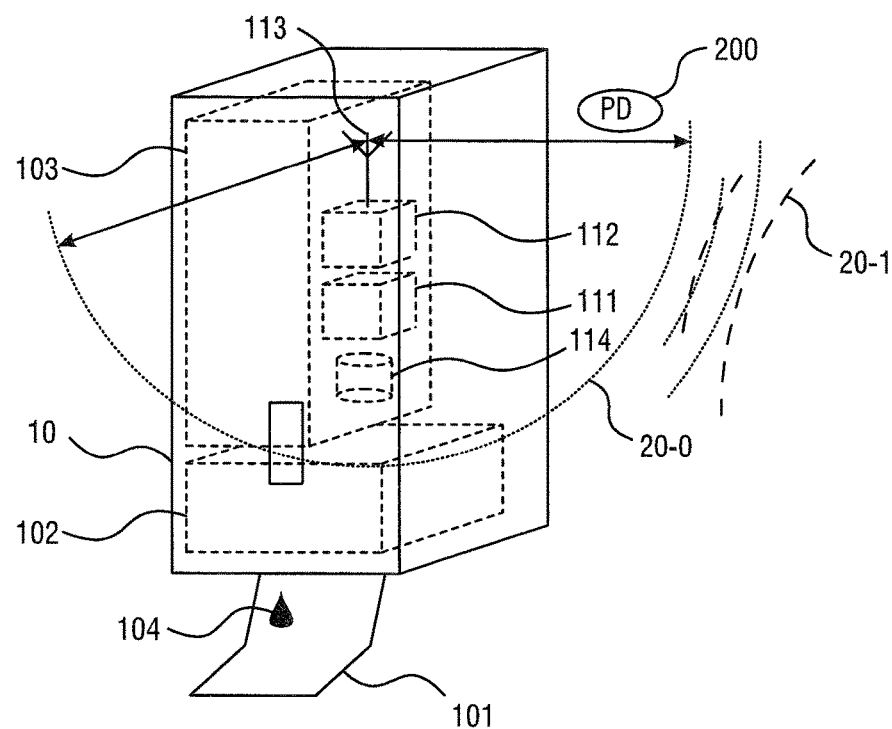
FIG. 1 shows a schematic view of a piece of hygiene equipment according to an embodiment of the present invention.

FIG. 1 shows a schematic view of a piece of hygiene equipment according to an embodiment of the present invention. Specifically, the figure shows a piece of hygiene equipment in the form of a soap, gel, foam, or liquid dispenser 10. As shown, the dispenser 10 is configured to dispense a consumable to a user in that, for example, a lever 101 is actuated for driving an ejection mechanism 102, which, in turn, ejects an amount 104 of the consumable held in a reservoir 103. The consumable may be accordingly liquid or solid soap, a disinfectant liquid/consumable, a foaming liquid, etc. As a consequence, a user's hand actuating the lever 101 can be provided with the amount 104 of soap, foam, or disinfectant. Although a liquid dispenser is shown, the following details may equally be combined with the respective components of a dispenser for solid substances, tissues, towels, absorbent articles, or other hygiene articles.

According to the shown embodiment, the shown piece of hygiene equipment 10 comprises a processing circuit 111 and a radio circuit 112. Generally, the latter radio circuit 112 is configured to receive and transmit a radio signal 20 carrying payload data 200. More specifically, the radio circuit 112 can be configured to receive an inbound radio signal 20-1 carrying payload data 200, and to transmit an outbound radio signal 20-0 carrying the payload data 200. Accordingly, the processing circuit 111 can be configured to obtain the payload data 200 carried by a received inbound radio signal 20-1 and/or to generate the payload data to be carried by a transmitted outbound radio signal 20-0. Generally, there is thus envisaged a two-way operation, although some embodiments of the present invention may rely and comprise only the configuration for one of the two directions, i.e., the receiving of inbound signals or the transmission of outbound signals.

The processing circuit 111 is further configured to obtain information on a positional relationship to another device by instructing the radio circuit to receive and/or transmit a radio signal carrying first payload data. The information on a positional relationship to another device can comprise information on a distance to the other device, information on a range, information on a 2D or 3D vector pointing to the other device, or on any coordinate position—in relative or in absolute terms—that allows determining a positional relationship to the other device. In one embodiment, for example, timing information indicating when the radio signal is received and/or transmitted by an antenna coupled to said radio circuit 111 can be obtained. In other words, the processing circuit 111 can obtain information on when an inbound radio signal reached the receiving antenna 113 and/or when an outbound radio signal leaves the antenna 113 coupled to the radio circuit 112. For this purpose, the piece of hygiene equipment 10 may as such comprise the antenna 113 that receives/transmits the radio signal 20 from or into a transmission range. Likewise, the antenna 113 may well be external to the piece of hygiene equipment and as such not comprised by the dispenser 10. Said first payload data may be employed to convey information on said timing information for the purpose of ranging and/or positioning. More detailed examples are described elsewhere in the present disclosure.

The processing circuit 111 is further configured to generate second payload data on the basis of the obtained information on a positional relationship, and to instruct the radio circuit 111 to transmit a radio signal carrying said second payload data. In other words, the piece of hygiene equipment can determine at least a positional relationship to one other device and can convey information on that determined positional relationship to any recipient in the radio range of the piece of hygiene equipment. As a consequence, a piece of hygiene equipment according to an embodiment of the present invention can be installed at a given position, and can automatically determine some kind of a relative position (e.g., one or more distances/ranges) to one or more neighboring devices.

This information can be collected by some kind of central entity which, in turn, is able to locate the individual pieces of hygiene equipment even in a larger installation. The embodiments of the present invention can thus provide the advantage of substantially facilitating the installation of hygiene equipment which is oftentimes installed in large premises and thus comprising usually a considerable number of individual dispensers and related devices. In a way, there can be first established a number of ranges to respective neighbors. Then, based on aggregated information a relative positional map can be established within a floating, relative coordinate system. This system can then be anchored in reality or mapped to the real world by defining one or more absolute points, e.g., in terms of real-world 3D coordinates.

The payload data (PD) 200 may generally comprise any suitable data, including information indicating an identification of the piece of hygiene equipment 10, information indicating an identification of an originator/transmitter of an inbound radio signal, information relating to timing information, information indicating a number of use instances of the piece hygiene equipment 10, and/or information indicating a filling state of the consumable in the reservoir 103. In the latter two cases, the processing circuit 111 may be coupled to sensors of the ejection mechanism 102 and/or, respectively, the reservoir 103 so as to be able to generate corresponding payload data. In general, the detailed mechanical and/or electronic mechanisms and configurations for dispensing an amount of consumable and detecting use instances and filling states are as such known in the prior arts. In general, however, the embodiments of the present invention are not limited to above mentioned types of information. Therefore, the PD may also comprise or relate to status data, or data on a physical observable like luminosity, light, humidity, temperature and the like may be conveyed. Further examples include data on a refill ID, data on occupancy or movement (by persons and/or equipment), and general content (e.g., messages, commercial images, etc.).

In a further embodiment of the present invention, the specific hitherto mentioned information is conveyed in the form of payload data carried by radio signals in specific modi and phases. In particular, the operation of the piece of hygiene equipment can be divided into two phases, a first installation phase in which the hygiene equipment is operated in a first mode and a second operation phase in which the hygiene equipment is operated in a second mode. In the first mode, the payload may be predominantly identified by the mentioned first and second payload plus, optionally, payload carrying information on timings, originators, identifications and the like. In the second mode the payload may be predominantly identified again by payload carrying information on originators and identifications, but it will likely also include information on the number of use instances and/or on one or more filling states of the considered reservoirs.

Figure 2:
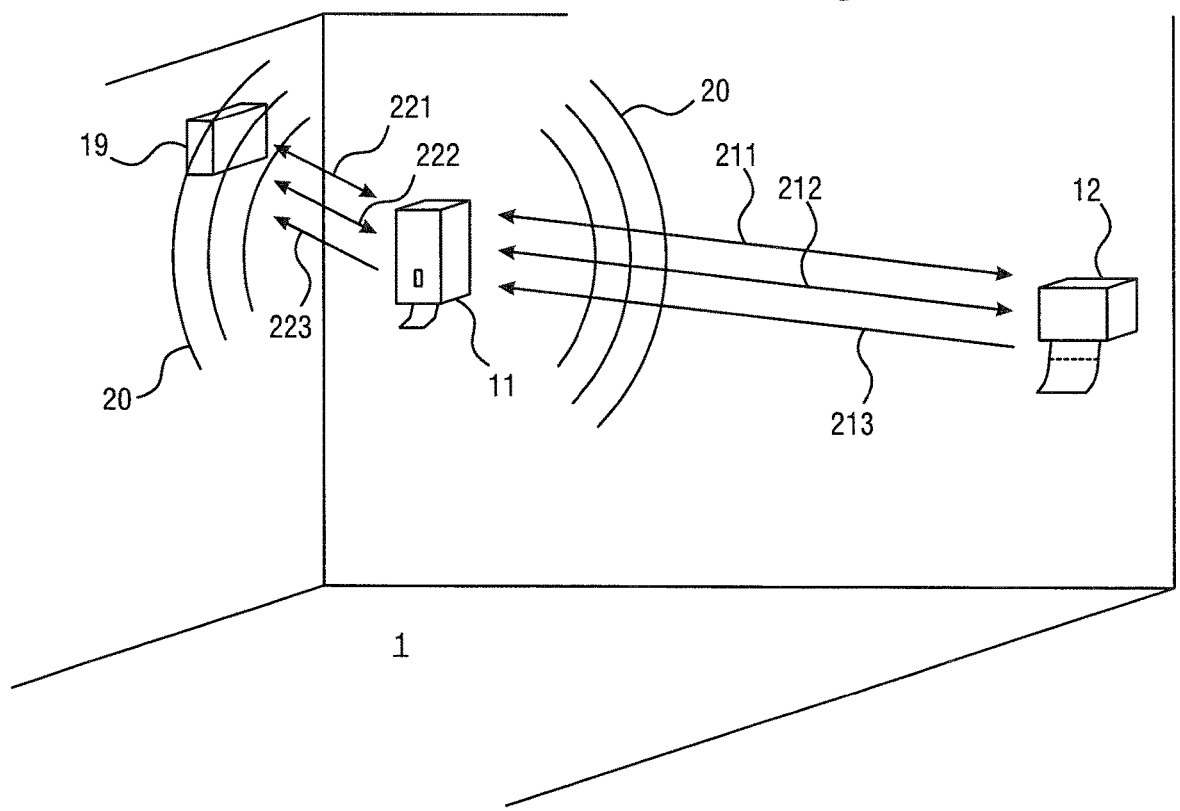
FIG. 2 shows a schematic view of operation of hygiene equipment according to an embodiment of the present invention.

FIG. 2 shows a schematic view of operation of hygiene equipment according to an embodiment of the present invention. It is firstly assumed that at certain locations of a room 1 there are installed pieces 11 & 12 of hygiene equipment. Each piece 11, 12 may be generally in line with an applicable embodiment as described in conjunction with the present disclosure. For example, piece 11 is shown as, for example, a disinfectant (e.g., alcogel) dispenser, and piece 12 is shown as, for example, towel dispenser. The device 19 is a data access point which can at least communicate with dispenser 11 so as to convey data from or to a conventional (external) data network (e.g., wireless or wired LAN, cellular communication network, Internet, etc.) to the pieces of hygiene equipment.

Generally, a piece of hygiene equipment according to an embodiment may have the processing section being configured to operate in a first mode and in a second mode, wherein during said first mode the processing section is configured to determine a communication partner, and during the second mode the processing section is configured to obtain the information on a positional relationship to the communication partner as the other device. The processing section may additionally be configured to generate the second payload data on the basis of the obtained information on the positional relationship to the communication partner.

In a first phase, for example, when being in the above-mentioned first mode, the dispenser 11, 12 exchange payload data 211 so as to identify each other as possible communication partners. The same is performed amongst device 19 and the dispenser 11 by means of payload data 221. This process may also involve the determination of a preferred communication direction, indicating that data can be conveyed via dispenser 11 to the access point 19, or from the access point 19 to dispenser 12 via dispenser 11. The process of finding communication partners and determining communication paths, routes, and directions is described in greater detail below. In any way, the result of the exchanged payload data 211 and 221 will be that both dispensers 11, 12 are aware of each other and may further exchange data to the data network via the access point 19.

After having established communication partners and paths, the devices 11, 12 exchange payload data 212 for determining information on a positional relationship. The same is carried out between device 19 and dispenser 11 by means of data 222. Although in room 1 three involved devices are shown, an installation may involve more than this. In particular, it may be considered that for obtaining position coordinates in three dimensions at least three input values have to be known. In other words, when information is known on three distances from one device to three other devices, a relative coordinate can be calculated over methods that are, as such, known in the arts (e.g., multilateration). This information can be processed and/or conveyed to another entity for processing so as to determine information on a location of the dispensers 11, 12.

For example, a sufficient number of individual dispensers in room 1 can be configured to determine information on a mutual positional relationship so as to establish coordinates in at least a relative coordinate system. With, for example, the position of device 19 either known or defined as origo and corresponding ranging, a position model can be obtained automatically which can serve as an information base for determining what dispenser is located where. The relative coordinate system thus created can be merged (translated/rotated/etc.) with, e.g., a 3D CAD drawing of the overall building so that an absolute coordinate system is made. This information can be forwarded, generated, or held in a remote entity, such as a central server also having access to the mentioned (external) data network.

In an embodiment, the position for the hygiene equipment thus obtained can now be used by the overall system to assign names to each piece of hygiene equipment and to structure them into a logical hierarchy based on location, to provide a base for further applications within the system. Via, e.g., a merged map of the building tangible information can also be assigned to the positional information defining each dispenser. These tangible data may include, e.g., room number, floor number, 3D-coordinates, and the like.

In embodiments of the present invention, information on individual distances in conjunction with respective identification information can be collected by the pieces of hygiene equipment in the form of a position/identification data set. Specifically, since the pieces of hygiene equipment can both determine information on a positional relationship to another device as well as convey such information to another device, the position/identification data set can be obtained. In, for example, a central server on the network side, the position/identification data set can be mined for finding all available distance values for each individual unit (i.e., piece of hygiene equipment or access point or relay). From this and given some origin, the position/identification data set can be processed in a chained fashion so as to build a coordinate system with all devices participating in the position data exchange. Missing devices or missing data (e.g., one device has reported only one or two or otherwise non-suitable distance relationships), a manual addition of data may of course complete the position model.

The result of concluding this first phase will be that a number of individual pieces of hygiene equipment have discovered themselves, have established communication routes and paths, and have determined—at least to some degree—positional relationship information that allows to, in turn, determine information on what piece of hygiene equipment is located where. As a consequence, the system may now proceed to a second operation phase in which the pieces of hygiene equipment are used along their intended purpose, detect use instances or filling levels, and to report—whenever found necessary—related information toward a central entity, e.g., the server over the (external) data network.

More specifically, the dispenser 12 will at a certain time detect that its supply of consumable (here tissues) is about to run empty. Accordingly, it may be determined that a refill of the reservoir becomes necessary. Based on the self-established communication paths, the dispenser 12 may generate payload including information on the necessity of such a refill and including information on an identification of dispenser 12. This data may be conveyed as 213 toward dispenser 11 which relays the information toward access point 19 via the communication 223. From there, the data can be conveyed to a central entity that has also access to information on where the dispenser 12 is located. As a result, guiding information can be generated that tells service personnel that a specific dispenser, located at a specific position (e.g., room number, floor number, 3D-coordinates, and the like) requires a specific refill (e.g., order number, consumable type ID, and the like).

In any way, data to be conveyed may include data identifying the dispenser and/or a location or position of that dispenser. Likewise, any other suitable data may be carried by the system instead of or in addition to the mentioned filling state data. In particular, also status data, or data on a physical observable like luminosity, light, humidity, smell, temperature and the like may be conveyed. Furthermore, also data on occupancy or movement (by persons and/or equipment) or general content (e.g., messages, commercial images, etc.) may be subject to the disclosed relaying. Any data may be time-stamped in the sense that a measurement or detection result is accompanying with information on a time when an observable was measured or an event was detected (e.g., when a dispensing or disposing action was detected, in other words, when a user has actually used the piece of hygiene equipment).

In an embodiment, positional information can be compiled by the devices as such, i.e., the involved pieces of hygiene equipment. In this way, no central entity may be necessary to provide such guiding information to users. This scenario may be referred to as a system which locally generates and provides location information, as opposed to a system which collects and processes all data at some kind of central entity (server, etc.).

Figure 3:
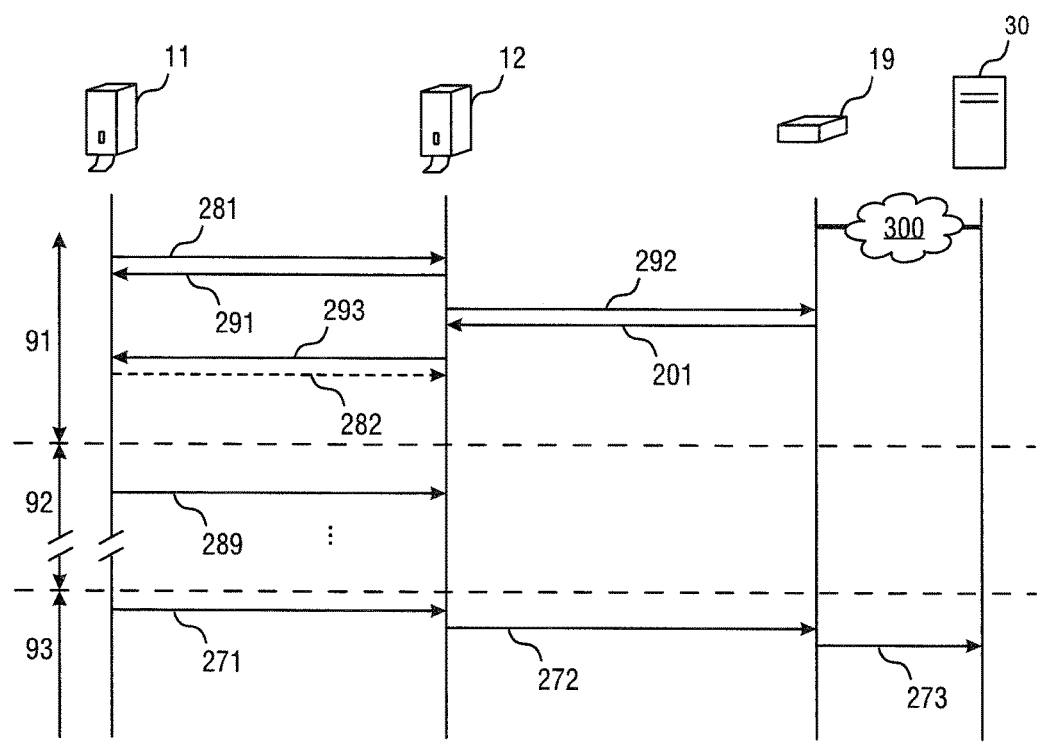
FIG. 3 shows a schematic sequence diagram of an exemplary modus operandi for establishing a communication according to an embodiment of the present invention.

FIG. 3 shows a schematic sequence diagram of an exemplary modus operandi for establishing a communication according to an embodiment of the present invention. In particular, it is considered a set-up of several devices including a first piece 11 of hygiene equipment, a second piece 12 of hygiene equipment, an access point 19, and a (remote) server or data processing repository 30. The latter two are assumed to communicate over a network 300 which is as such known. Specifically, the target device 19 may be some kind of network access point or gateway in the sense that the relayed and received data can be forwarded to network 300. For example, the target device has access to a local area network (LAN) or a wireless LAN (WLAN, WiMAX, WiFi, etc.) or another telecommunication network (GSM, PCS, GPRS, EDGE, 3GPP, UMTS, LTE, etc.). In this way, the relayed and received data can be collected from a plurality of pieces of hygiene equipment and be forwarded to some kind of service point. In a way, the other devices have therefore an indirect or multi-hop access to one of the above-mentioned networks.

During the first phase 91 at least some part of the involved devices may be in the first mode for automatically establishing communication partners and/or paths. Specifically, the pieces 11 and 12 may determine each other as possible communication partners by exchanging data portions 281, 291. For example, and with additional reference to FIG. 1, the piece of hygiene equipment can employ its radio circuit 112 to transmit an outbound radio signal 281 carrying transmission payload data (TxPD) and to receive an inbound radio signal 291 carrying reception payload data (RxPD) for determining the communication partner 12 to which outbound radio signals are to be transmitted and from which inbound radio signals are to be received. More specifically, the processing circuit 111 can be configured to instruct the radio circuit 112 to transmit the outbound radio signal 281 carrying specific transmission payload data that can be received by any suitable receiver within the transmission range. This range may be in the order of several meters, several tens of meters, hundred or several hundreds of meters, and more, depending on the employed transmission power and technology. With regard to the latter, any suitable technology and protocols may be employed and preferred standards and technologies include Bluetooth™, WiFi, WLAN, WiMAX, UWB (ultra wide band), LORAN, ZigBee, Z-wave, IEEE 802.11, IEEE 802.15, IEEE 802.15.4/4a (2006, 2007, 2011, . . . ) and related or similarly suitable technologies.

The outbound signal 281 may be received by one possible communication partner, here device 12, being a further piece of hygiene equipment or a dedicated access point or base station, which may send a return radio signal 291 carrying again specific payload data. With the received specific payload data at hand, the processing circuit 111 can determine the device 12 as the communication partner to which outbound radio signals are to be transmitted and from which inbound radio signals are to be received. In this way, the processing circuit 111 can store information on the determined communication partner 12. This information, as well as the information representing the specific transmission and/or reception payload data, can represent addresses or identification values of the involved devices. For example, the specific transmission payload data may represent an ID of the piece of hygiene equipment 11 and, optionally, data explicitly indicating the attempt to find a communication partner. The latter can receive this data and complete a so-called pairing process by responding with the specific reception payload data, including, for example, information on an ID or address of the device 12.

The result of this procedure may be that both devices 11 and 12 have identified the other device as a potential communication partner, which would as such not establish a preferred communication direction. The same procedure may be carried out with data 292, 201 exchanged between devices 12 and 19, where the latter device 19 is an access point in the sense that it can directly forward data to the server 30. This property may be known to the access point 19, so that corresponding information can be conveyed with data 201 to the device 12. In other words, devices 12 and 19 can determine that the direction from the device 12 to the device 19 is the preferred direction of forwarding or relaying data. Since device 12 is also aware of the further communication partner 11 but also is aware of the preferred direction toward device 19, corresponding data 293 is conveyed to device 11. As a result, the devices may store information relating to their communication partner as follows:

| Device: | Stores as communication partner: |
|---|---|
| 11 | 12 |
| 12 | 19 |
| 19 | n/a |

This implies the direction 11→12→19. In other words, the term communication partner is understood to identify the device to which data is preferably addressed and/or transmitted. Additionally, the embodiments of the present invention may consider one or more "fall-back" routes in order to make the data exchange system as such more robust. In such embodiments, an alternative communication path is established between the devices 11 and 19 over, say another piece of hygiene equipment. Should the communication over the device 12 in the above example fail, the communication could be routed from device 11 to device 19 via said other piece of hygiene equipment.

As part of the initial configuration and/or manufacturing, the device 19 can be made aware that it is a data access point and the direction of communication is preferably to the device 19. This information can be identified in the sense of directional information so that any device having such information can determine a preferred direction of forwarding/relaying or can communicate (e.g., step 293 in FIG. 2) the property to other devices so as to determine the proper forwarding/relaying direction. A step 282 of acknowledging the preferred direction is optional.

In a further phase 92 the involved devices may be in a second mode in which at least one device determines information on a positional relationship to another device. For example, each device can attempt to obtain such information for each communication partner it is aware of after the first phase 91. This may employ the transmission and reception of one or more signals 289 that carry payload data that may referred to as the so-called first payload data elsewhere in the present disclosure. Details of some possible embodiments for determining the information on a positional relationship by means of transmitting/receiving such signals 289 are described below. In the context of the present overview picture, however, it is assumed that after the second phase 92, at least one device, for example, dispenser 11, has information on a positional relationship to another device, for example, information on a distance to device 12.

This information on the positional relationship can then be encoded in the so-called second payload data. For example, second payload data is generated in device 11 including any information on positional relationships to other devices that the device 11 is aware of in the form of possible communication partners. For example, device 11 may not only have device 12 in its range but also information on a positional relationship to one or more further devices. This information can be sent as the second payload data by means of the data 271. Employing then a possibly present communication path and/or preferred communication partners and directions, this second payload data can be conveyed in transmissions 272 and 273 to the central entity or server 30.

In other words, the piece of hygiene equipment 11 may generate a report on any determined positional information or timing information and transmit this report as a data message 271. Since the piece of hygiene equipment 12 is in the same mode and knows about the partners and direction, it can relay this data with a data message 272 to the access point 19, which, eventually, can forward the data message 273 to the server 30. In this way, the data of the hygiene equipment as such is collected over a self-established system of communication paths. In other words, at some central entity, e.g., at the server 30, all the information of positional relationships can be collected.

For example, the entity 30 may obtain information on a distance between device 11 and device 12, information on a distance between device 12 and device 19, and so on, including all devices that are in reach to each other. During data processing the collected data may be searched for finding sufficient data sets that allow for positioning the individual devices. For example, the collected data may comprise information on three distances to device 11, each distance measured from another device, so that the position of device 11 can be calculated at least relative to the remaining device. If this relationship is parsed for iteratively, a full set of positional data can be calculated. During this process, additional data may be fed into the system, including data on known positions for devices or origins. Naturally, the conveyed data can also relate to other issues including consumption or filling level and can likewise relate to commands to initiate a specific operation mode, commands in general terms, request commands for collecting any other information such as IDs, power levels, position information, general purpose data packets carrying any suitable content.

In general, a multi-hop arrangement can be implemented by means of several pieces of hygiene equipment. As a consequence, there may be no need for any wiring between the individual devices for establishing a multi-hop relaying of data. Furthermore, the overall extent of the communication range can be substantially increased, although one individual piece of hygiene equipment may only have a limited transmission range. That is, since the power resources available (e.g., in the form of a battery) may be limited, also the transmission power, and, with this, the range may be limited. As shown, however, the multi-hop arrangement by means of several relaying devices can extend the range over the entire installation of one or more restrooms.

According to an embodiment of the present invention, the radio circuit and processing circuit are arranged to check for any ongoing transmissions in a relevant frequency band prior to transmitting any data. In other words, the radio circuit "listens" before starting the transmission so as to avoid interference by transmitting into an already ongoing transmission process. According to a further embodiment of the present invention, the transmission is initiated only after a predetermined delay after receiving the payload data. In further embodiments, said predetermined delay is specific to the piece of hygiene equipment, so that two pieces of hygiene equipment likely have different predetermined delays.

In general, a piece of hygiene equipment according to an embodiment of the present invention has the capability of storing information that can identify the piece. Specifically, the processing circuit may be provided with a memory 114 that stores an identifier or serial number in a non-volatile manner. In this way, the identification can be set during manufacturing, possibly as a unique identifier, or the identifier can be set or modified later by means of reprogramming the memory. In the context of the above-mentioned pre-determined delay it is noted that some embodiment of the present invention considers that the predetermined delay is dependent on the identifier. In other words, different identifiers may result in different values for the predetermined delay.

While it is clear that there may be a large number of different identifiers (e.g., an 8-digit serial number) it is likewise clear that a corresponding number of sufficiently different delays may not be feasible. In particular, this may result in some of the delay values to be undesirably long. As a consequence, a reuse scheme may be adapted so that, for example, an acceptable set of different delay values is reused over consecutive serial numbers. If this scheme is adopted consecutively with increasing serial number, the advantage can be obtained that units being manufactured during a given time interval are both likely to be shipped together and installed at the same premises as well as to have different delay values.

Moreover, a further embodiment of the present invention considers that the processing circuit is arranged to change the delay when interference is detected. Specifically, the processing section may employ the radio circuit to monitor any present radio signals during the time when transmission takes place. If, for example, the transmitted relayed payload data can be well received, then this can be taken as an indication that no interference needs to be considered. However, should it be not possible to receive the transmitted relayed payload data during transmission, then this may be taken as an indication for interference and the delay may be changed. Again, this change may be made dependent of the identifier, so that two neighboring and interfering dispensers will eventually choose different values for the delay so as to relay data without interference.

Figure 4:
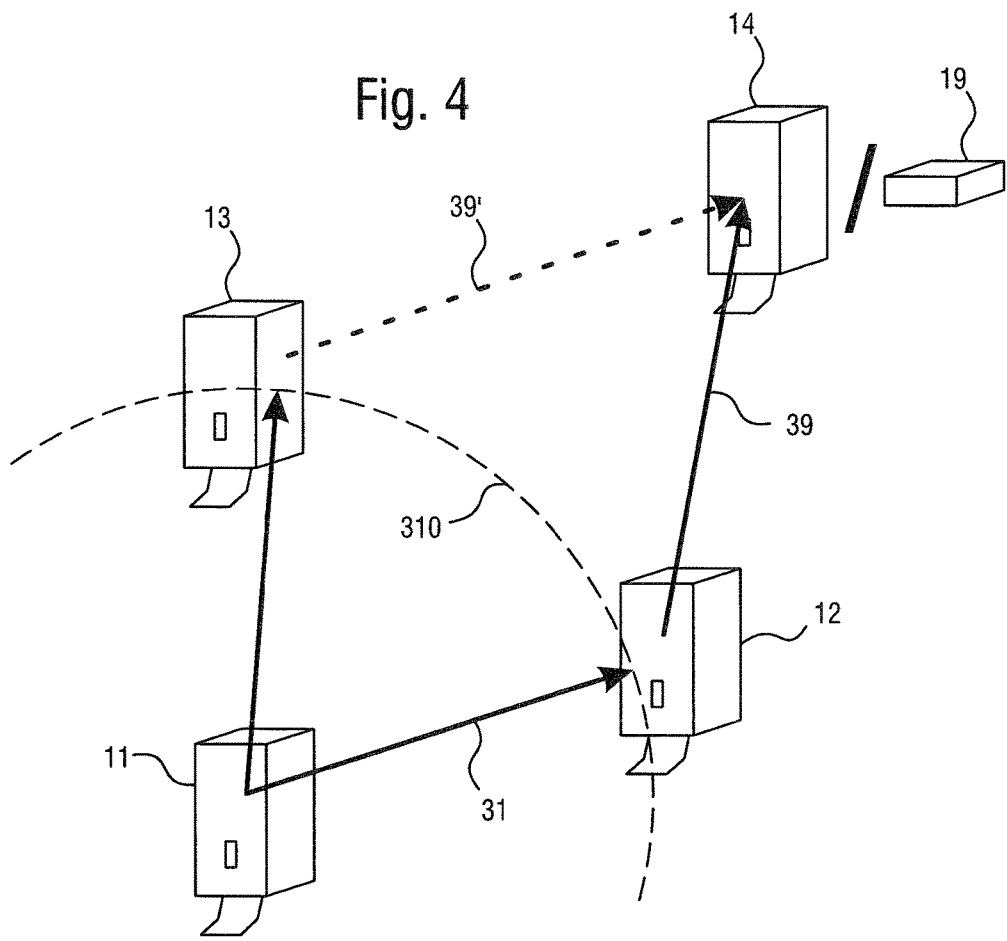
FIG. 4 shows a schematic view of an installation of several pieces of hygiene equipment during communication according to an embodiment of the present invention.

FIG. 4 shows a schematic view of an installation of several pieces of hygiene equipment during communication according to an embodiment of the present invention. Specifically, the mode of operation with regard to transmission delay and possible interference shall be described. A first piece of hygiene equipment 11 is configured to emit a radio signal 31 comprising payload data into a range 310 where the signal 31 can be received essentially contemporaneously by the second piece of hygiene equipment 12 and third piece of hygiene equipment 13. In case both the second piece of hygiene equipment 12 and third piece of hygiene equipment 13 would be configured in the same way, a situation may need to be considered in which both pieces transmit the relayed payload data by radio signals 39 and 39' essentially at the same time. As a consequence, interference between signals 39 and 39' may occur which may render it impossible for the fourth piece of hygiene equipment 14—or the access point 19—to receive a signal in a proper way.

Some embodiments of the present invention provide a configuration that allows two or more pieces of hygiene equipment that all receive payload data to relay this data without interference and disruption and in a reliable way. In a specific embodiment, the pieces of hygiene equipment consider varying delay values for delaying the transmission of relayed payload data. In the particular example of FIG. 4, this may be implemented as follows: For example, the second piece of hygiene equipment (e.g., dispenser) 12 is configured with a shorter delay as compared to the third dispenser 13.

As a consequence, the dispenser 12 can emit the radio signal 39 toward the target without interference, since the third dispenser 13 is still waiting for its (longer) delay to elapse. After also this delay has elapsed, the dispenser 13 may also transmit the radio signal 39', which may be used for an increase of reliability by redundancy by the target 14 or 19, or may be simply ignored. In the latter case, any receiving entity (e.g., target or piece of hygiene equipment) may buffer a data message (payload data) for at least the time of a longest delay in the system, and compare any received data to data recently relayed and transmitted in order to decide whether a further transmission of relayed payload data may be suppressed.

Likewise, in another embodiment, the piece of hygiene equipment 13 may monitor any further transmissions from other devices in response of receiving a signal with payload data to be relayed. Specifically, the third piece of hygiene equipment 13 may also receive the radio signal 39 transmitted from the second piece of hygiene equipment 12 and thus may realize that data corresponding to the signal 31 has already been forwarded for relaying. As a consequence, the device 13, just as generally any piece of hygiene equipment according to this embodiment, may decide on its own whether or not to transmit the data to be relayed.

As already mentioned, there are embodiments in which a delay value is dependent on an identifier of the individual piece of hygiene equipment. In this way, for example, it can be ensured that devices 12 and 13 have not conflicting (same or similar) delays, where they would transmit any data to be relayed at overlapping times which would—in turn—likely produce interference and render at least problematic the reception of the data by the target entity. Specifically, devices manufactured with serial numbers in the vicinity/proximity or a given range may be ensured to all have default delays that differ from each other. As a consequence, when devices 12 and 13 are installed at the same time, it can be ensured that no interference occurs.

However, there also exists the possibility that neighboring devices are provided with conflicting delays due to various reasons (replacement devices, coincidence, etc.). In some embodiments of the present invention it is, therefore, considered to activate signal reception also during signal transmission. In this way, a piece of hygiene equipment may detect the occurrence of interference during the time it transmits a radio signal for relaying payload data. In response to a corresponding detection, the delay may be changed, this, in turn, optionally again in dependence of the identifier. As a consequence, it can be ensured that two neighboring pieces of hygiene equipment carrying different identifiers switch to non-conflicting delays after interference has occurred.

In the above, several embodiments have been described that provide at least one of various advantages. Specifically, the pieces of hygiene equipment can be installed at the desired locations without the need for any manual or additional configuration effort. To the contrary, the devices are able to build a real self-organized "network" for relaying and forwarding data toward a given target. This can substantially facilitate the setup and mounting of pieces of hygiene equipment with the corresponding functionalities. Naturally, the devices may be still equipped with switches or a communication interface that allows for manual reprogramming once the automatic procedures for relaying data fail or needs to be modified for other reasons.

In a further embodiment a piece of hygiene equipment has a processing section that is further arranged to add data to the data to be relayed before transmitting. In the shown exemplary situation of FIG. 4, the dispenser 12 may receive data from the dispenser 11 which is data to be relayed toward the device/dispenser 14. However, in this embodiment, dispenser 12 adds data, for example in relation to its own filling state or its own measured observable, to the data to be relayed before transmitting any signals. In this way, the device/dispenser 14 receives data from both originators, namely dispenser 11 and 12 in this case, in one instance. This way forward can substantially contribute in saving power resources in the involved pieces of hygiene equipment, since the number of transmission instances can be reduced by "accumulating" data before the actual transmission.

FIG. 5 shows a schematic view of positioning with hygiene equipment according to an embodiment of the present invention. Specifically, the hygiene equipment is shown in the context of a room 1 of the above discussed exemplary premises. For example, room 1 is an intensive care ward room of a hospital. As usual, such a premise is provided with hygiene equipment and so is the ward room 1 as shown in FIG. 5. Namely, there are shown two pieces of hygiene equipment in the form of the liquid dispenser 11 and the tissue dispenser 12, which are, as such provided with the respective components and functionalities as described in conjunction with the corresponding embodiments of the present invention.

Specifically, the pieces 11 and 12 of hygiene equipment are in this exemplary configuration set up to transmit the respective radio signals 21-0 and 22-0. In this or in other embodiments, radio signals may be instead or additionally received by the pieces 11 and 12 of hygiene equipment. A third radio signal 23-0 is emitted into room 1 from equipment that is as such not shown. In any way however, two or more radio signals are transmitted into room 1 in order to allow a determination of a position 30. Naturally, the dimensionality and precision of position 30 may depend on the number of receivable signals and the corresponding properties of these signals. In general, two or more signals originating from known sources may allow the determination of a 2D-position, and three or more signals originating from known sources may allow the determination of a 3D-position. Usually, it may be desired to have even more than three signals at hand which then not only contributes in an improved accuracy but may also compensate for shadowing or reflection phenomena.

Figure 6C:
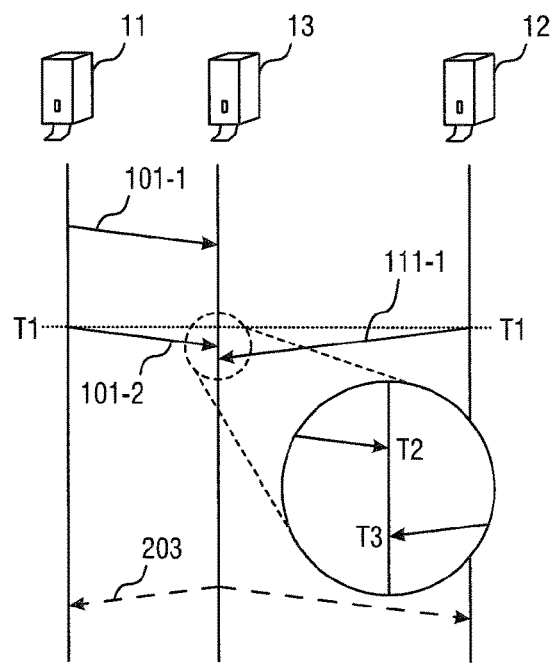

FIGS. 6A to 6D show schematic views of mechanisms for ranging by employing a time-of-flight determination of radio signals according to embodiments of the present invention. Specifically, FIG. 6A shows a schematic view of a general variant of so-called two way ranging (TWR) between pieces of hygiene equipment 11 and 12 (e.g., a dispenser), when, for example, the dispenser 11 acts as a beacon. It is thus assumed that the dispenser 11 transmits beacon signals 101-1, 101-2, in regular or irregular intervals. At some given time, the device 12 can receive the beacon signal 101-3. The device 12 can obtain information on the timing when the signal 101-3 was received (T2) and obtain information on when a response signal 201 is transmitted (T3) toward the dispenser 11.

The payload in the beacon signal 101 may contain information on identifying the dispenser 11, and this information may be encoded, together with relative or absolute information on the receiving/transmission timings, onto the payload of the response signal 201. The dispenser can thus obtain information on the timing when the signal 201 was received (T4) and obtain information on the timing when the signal 101-3 was transmitted (T1). Together with the timing information contained in payload data of signal 201, the processing circuit of the dispenser is able to determine the distance d between the dispenser 11 and the dispenser 12 by employing a calculation such as $$d = c \cdot \frac{[(T4 - T1) - (T3 - T2)]}{2}, \qquad (1)$$

where c denotes the speed of light, the applicable propagation speed for radio signals. Further, the conveyed payload may also be employed to ensure that the signal 201 is in actual response to the beacon signal 101-3. In addition to this, further signals may be employed for any one of improving accuracy, employing cancelling techniques or adding redundancy.

FIG. 6B shows a schematic view of a similar ranging scheme where it is assumed that the device 12 transmits beacon signals 201-1, 201-2, in regular or irregular intervals. The ranging is carried out similar to the situation of FIG. 6A, taking into account—at least indirectly—the timings T1 to T4. Here, an additional signal 202 is employed, since the distance determination is made at the site of the device 11 and the necessary information on the timings should be available there.

FIG. 6C shows a schematic view of time difference of arrival (TDOA) scheme between more than one piece of hygiene equipment. Specifically, two pieces 11 and 12 of hygiene equipment transmit beacon signals 101-1, . . . and, respectively, 111-1, . . . into some overlapping range. At some point in time, the piece of hygiene equipment 13 is assumed to have received the two beacon signals 101-2 and 111-1. Both dispensers 11, 12 obtain information on timing when the signals 101-1 and 111-1 are transmitted by their respectively coupled antennae. In this embodiment, the information on the timing can be identified as an instruction or synchronization signal employed for the plurality of dispensers 11, 12 to transmit the signals 101-1 and 111-1 at substantially the same time T1. In this way, the device 13 may determine different timings when the different signals are received. Namely, the signal 101-2 can be assumed to be received at T2 at device 13, and the signal 111-1 can be assumed to be received at T3 at device 13. With this knowledge, the device 13 can initiate ranging calculations. Again, further signals may be employed for any one of improving accuracy, employing cancelling techniques or adding redundancy. In addition, any determined distance or difference may be conveyed to some central entity (server) via another means of communication (e.g., a wireless network connection) or via an optional signal 203 to any one of the involved devices.

Figure 6D:
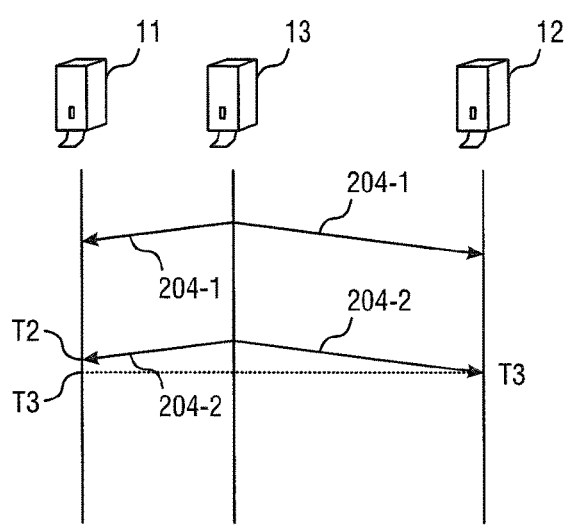

FIG. 6D shows a schematic view of another time difference of arrival (TDOA) scheme. Specifically, this scheme is similar to the one described in conjunction with FIG. 6C, but here the piece of hygiene equipment 13 is the originator of the beacon signal. Therefore, the device 13 is assumed to transmit the beacon signals 204-1, 204-2, . . . at regular or irregular intervals. It may now be assumed that dispenser 11 receives the particular signal 204-2 at time T2, whereas dispenser 12 receives this particular signal 204-2 at time T3. Again, the payload carried by the signal 204 may be employed for facilitating identification and association of any received signals. The dispensers can obtain information on the receiving times T2 and T3 and can decode any payload to accomplish the mentioned association, so as to determine a time difference of arrival of one signal at different locations. This information may be fed back to the target device and/or a central entity (server) to complete a ranging and/or positioning calculation.

As for further possible ways of initiating the sequence, it is noted that the configuration shown in FIG. 6D can be modified so that the device 13 is passive and 'listening' until device 11 or 12 sends a message to initiate the process (ranging). When device 13 receives this 'ping' request, it can transmit a 'single ping' that is received by devices 11, 12, where these devices are operated in synchronization and can calculate the desired information based on TDOA. In TDOA, devices 11 and 12 can be operated to be in synchronization and information on the timing T3 can be, for example, transported to device 11, when TDOA calculations are supposed to take place in device 11. The dispensers can then obtain information on the receiving times T2 and T3 and can decode any payload to accomplish the mentioned association.

Figure 7:
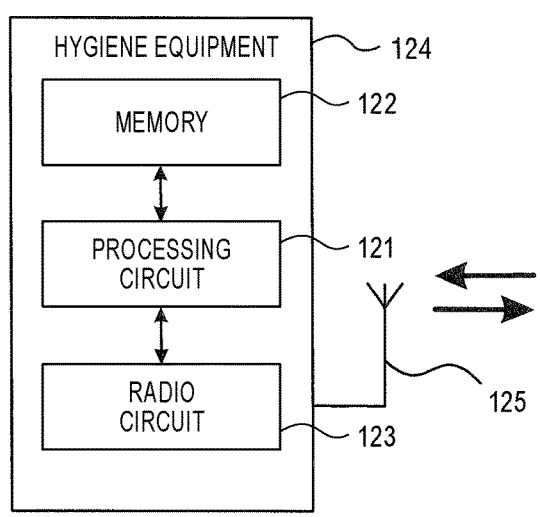
FIG. 7 shows a schematic view of device functionalities for implementing embodiments of the present invention.

FIG. 7 shows a schematic view of device functionalities for implementing embodiments of the present invention. Specifically, a piece of hygiene equipment 124 has a processing circuit 121, a memory 122, a radio circuit 123, and an antenna 124. The radio circuit 123 is configured to receive and transmit a radio signal carrying payload data using the antenna 124. The memory 122 stores code to configure the processing circuit 121 to obtain information on a positional relationship to another device by instructing the radio circuit to receive and/or transmit a radio signal carrying first payload data, and to generate second payload data on the basis of the obtained information on the obtained positional relationship, and to instruct the radio circuit to transmit a radio signal carrying said second payload data.

Figure 8:
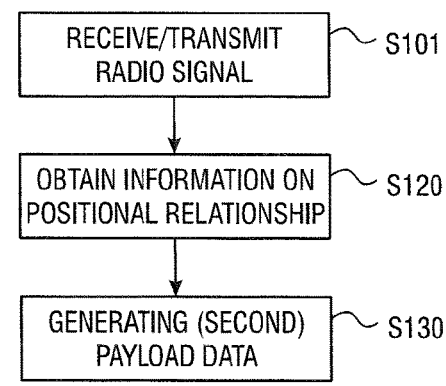
FIG. 8 shows a flowchart of a general method embodiment of the present invention.

FIG. 8 shows a flowchart of a general method embodiment of the present invention. Specifically, the method is for operating a piece of hygiene equipment that has a processing circuit, a memory, and a radio circuit. The method comprises a step S101 of receiving and transmitting a radio signal carrying payload data, a step S102 of obtaining information on a positional relationship to another device by instructing the radio circuit to receive and/or transmit a radio signal carrying first payload data, and a step S103 of generating second payload data on the basis of the obtained information on the obtained positional relationship, and to instruct the radio circuit to transmit a radio signal carrying said second payload data.

Although detailed embodiments have been described, these only serve to provide a better understanding of the invention defined by the independent claims, and are not to be seen as limiting While the present invention has been illustrated by description of various embodiments and while those embodiments have been described in considerable detail, it is not the intention of Applicants to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of Applicant's invention.

What is claimed is:

1. A piece of hygiene equipment, comprising:
   a processing circuit and a radio circuit,
   wherein the radio circuit is configured to receive and transmit a radio signal carrying payload data,
   wherein the processing circuit is configured to obtain information on a positional relationship to one or more other devices by instructing the radio circuit to receive and/or transmit a radio signal carrying first payload data,
   wherein the processing circuit is configured to generate second payload data that includes encoded data indicating the positional relationship of each of the one or more other devices, and to instruct the radio circuit to transmit a radio signal carrying said second payload data, and
   wherein the processing circuit is configured to transmit an outbound radio signal carrying specific transmission payload data and/or to receive an inbound radio signal carrying specific reception payload data for determining a communication partner to which outbound radio signals are to be transmitted and from which inbound radio signals are to be received.

2. The piece of hygiene equipment according to claim 1, wherein the processing circuit is configured to obtain the first payload data carried by a received radio signal and/or to generate the first payload data carried by a transmitted radio signal, and wherein the processing circuit is configured to obtain timing information indicating when the radio signal is received and/or transmitted by an antenna coupled to said radio circuit for obtaining said information on said positional relationship.

3. The piece of hygiene equipment according to claim 2, wherein said timing information is obtained relative to further timing information which indicates when a further radio signal is transmitted by an antenna coupled to a transmission circuit of a further piece of hygiene equipment.

4. The piece of hygiene equipment according to claim 2, wherein said timing information is obtained before said radio signal is transmitted by the antenna.

5. The piece of hygiene equipment according to claim 4, wherein said payload data includes information indicating said timing information.

6. The piece of hygiene equipment according to claim 5, wherein said processing circuit is configured to instruct the radio circuit to receive and/or transmit a radio signal carrying the first payload data including the information indicating said timing information.

7. The piece of hygiene equipment according to claim 1, wherein the processing circuit is configured to generate the first payload data further including information indicating an identification of said piece of hygiene equipment.

8. The piece of hygiene equipment according to claim 1, wherein the processing circuit is configured to obtain the first payload data carried by a received radio signal and to determine a positional relationship to an originator of the received radio signal.

9. The piece of hygiene equipment according to claim 8, wherein the processing circuit is configured to obtain individual sets of first payload data carried by received radio signals from a plurality of originators.

10. The piece of hygiene equipment according to claim 8, wherein the processing circuit is configured to generate said second payload data to share information on the determined positional relationship with one or more originators.

11. The piece of hygiene equipment according to claim 8, wherein the information on the determined positional relationship indicates a location of an originator.

12. The piece of hygiene equipment according to claim 1, wherein the processing section is configured to determine said communication partner and to store information on the determined communication partner in a memory section.

13. The piece of hygiene equipment according to claim 1, wherein said processing section is configured to operate in a first mode and in a second mode, wherein during said first mode the processing section is configured to determine the communication partner, and wherein during said second mode the processing section is configured to obtain the information on a positional relationship to the communication partner as the other device.

14. The piece of hygiene equipment according to claim 13, wherein said processing section is configured to generate said second payload data on the basis of the obtained information on the positional relationship to the communication partner.

15. The piece of hygiene equipment according to claim 13, wherein the first and second modes are activated for a predetermined time after power-up of the piece of hygiene equipment.

16. The piece of hygiene equipment according to claim 1, wherein the piece of hygiene equipment further comprises an electric power source.

17. The piece of hygiene equipment according to claim 16, wherein an insulating slip inhibits an electrical connection to the electric power source, and the piece of hygiene equipment is powered up by removing said slip.

18. The piece of hygiene equipment according to claim 1, wherein the processing section is further arranged to delay the transmitting of said first and/or second payload data according to a predetermined value.

19. The piece of hygiene equipment according to claim 18, wherein the predetermined value is specific to the piece of hygiene equipment.

20. The piece of hygiene equipment according to claim 19, wherein the piece of hygiene equipment has assigned an identifier, and wherein the predetermined value is set in relation to said identifier.

21. The piece of hygiene equipment according to claim 1, further being configured to dispense a consumable to a user or to dispose a consumable from a user, and further comprising a sensor section configured to determine a value relating to a reservoir of said consumable, wherein the processing section is arranged to compile payload data in relation to the determined value.

22. The piece of hygiene equipment according to claim 1, comprising any one of a soap dispenser, towel dispenser, disinfectant dispenser, alcogel dispenser, tissue dispenser, hygiene article dispenser, waste bin, used towel bin, and a toilet paper dispenser.

23. A system comprising a plurality of pieces of hygiene equipment according to claim 1.

24. A method of operating a piece of hygiene equipment comprising a processing circuit and a radio circuit, the method comprising the steps of:
receiving and transmitting with the radio circuit a radio signal carrying payload data,
obtaining information on a positional relationship to one or more other devices by instructing the radio circuit to receive and/or transmit a radio signal carrying first payload data,
generating second payload data that includes encoded data indicating the positional relationship of each of the one or more other devices, and to instruct the radio circuit to transmit a radio signal carrying said second payload data, and
transmitting an outbound radio signal carrying specific transmission payload data and/or receiving an inbound radio signal carrying specific reception payload data for determining a communication partner to which outbound radio signals are to be transmitted and from which inbound radio signals are to be received.

* * * * *